(12) United States Patent
Ting et al.

(10) Patent No.: US 12,146,570 B2
(45) Date of Patent: Nov. 19, 2024

(54) DYNAMIC BELT TENSION INFERENCE METHOD AND RELATED MOTOR DRIVEN ROLLER SYSTEM

(71) Applicant: DELTA ELECTRONICS, INC., Taoyuan (TW)

(72) Inventors: Ning Ting, Taoyuan (TW); Chia-Hsien Chao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/223,524

(22) Filed: Jul. 18, 2023

(65) Prior Publication Data

US 2024/0328484 A1 Oct. 3, 2024

(30) Foreign Application Priority Data

Mar. 29, 2023 (CN) .......................... 202310318297.5

(51) Int. Cl.
  *F16H 61/00* (2006.01)
  *F16H 7/08* (2006.01)
  *G05B 13/04* (2006.01)

(52) U.S. Cl.
  CPC ............. *F16H 7/08* (2013.01); *G05B 13/042* (2013.01); *F16H 2061/0093* (2013.01); *F16H 2061/0096* (2013.01)

(58) Field of Classification Search
  CPC .............. F16H 7/08; F16H 2061/0093; F16H 2061/0096; G05B 13/042
  See application file for complete search history.

(56) References Cited

U.S. PATENT DOCUMENTS

| 2021/0004683 A1 | 1/2021 | Matsumura |
| 2021/0103267 A1 | 4/2021 | Hu et al. |
| 2021/0348974 A1 | 11/2021 | Sekiguchi et al. |

FOREIGN PATENT DOCUMENTS

| CN | 105417014 A | * | 3/2016 | ............. B65G 23/44 |
| CN | 112215352 A | * | 1/2021 | |

(Continued)

OTHER PUBLICATIONS

Office Action dated Jun. 13, 2023 of the corresponding Taiwan patent application 112111961.

*Primary Examiner* — Justin Holmes
(74) *Attorney, Agent, or Firm* — Chun-Ming Shih; HDLS IPR SERVICES

(57) ABSTRACT

A dynamic belt tension inference method includes steps of: (A) performing a training process and (B) performing an inference process. Step (A) includes steps of: using Isolation Forest algorithm to train a tension inference model; using Isolation Forest algorithm under the same hyper-parameter set to perform multiple trainings to generate multiple tension inference models; respectively computing multiple model performances of the multiple tension inference models according to the anomaly score and a pre-recorded data label; computing an averaged model performance; determine whether multiple averaged model performances have been acquired; selecting one of the multiple hyper-parameter sets that corresponds to an optimal averaged model performance as a final hyper-parameter set for training to output an final model. Step (B) includes a step of: inferring processed data by the final model to generate the anomaly score and the dynamic tension corresponding to the anomaly score.

10 Claims, 8 Drawing Sheets

(56) References Cited

FOREIGN PATENT DOCUMENTS

| | | |
|---|---|---|
| CN | 112362214 A | 2/2021 |
| CN | 110490995 B | 8/2021 |
| CN | 114997069 B | 10/2022 |
| TW | 201942040 A | 11/2019 |
| TW | 202035201 A | 10/2020 |

\* cited by examiner

DYNAMIC BELT TENSION INFERENCE METHOD AND RELATED MOTOR DRIVEN ROLLER SYSTEM

BACKGROUND

Technical Field

The present disclosure relates to a dynamic belt tension inference method and a related motor driven roller system, and more particularly to an AI-based dynamic belt tension inference method and a related motor driven roller system.

Description of Related Art

A motor driven roller (MDR) system drives a belt to rotate through roller shafts that are driven by motors, thereby driving mechanism parts or components on the belt. If a tension value of the belt is insufficient or its tension characteristics is affected due to aging or embrittlement, the force provided by the motor cannot be fully conveyed when the belt is driven by the motor, resulting in poor motor-driving performance.

Currently, contact-type mechanical tension gauges or non-contact infrared/ultrasonic tension gauges are commonly used to measure the tension of the belt. However, these measurement manners can only measure the static tension when the belt is in a stationary state, while the tension of the belt in a non-stationary (dynamic) state is unknown, that is, the dynamic tension cannot be accurately measured.

Therefore, how to know the dynamic tension of the belt when the motor is rotating so as to confirm a driving performance of the motor has become a critical topic in this field.

SUMMARY

An objective of the present disclosure is to provide a dynamic belt tension inference method and a related motor driven roller system using a machine learning model to infer the dynamic tension of the belt during rotation.

In order to achieve the above-mentioned objective, the dynamic belt tension inference method includes steps of: (A) performing a training process and (B) performing an inference process. The step (A) includes steps of: (A1) using an Isolation Forest algorithm to train a tension inference model, wherein the tension inference model is configured to generate an anomaly score and a dynamic tension corresponding to the anomaly score: (A2) using the Isolation Forest algorithm under the same hyper-parameter set to perform multiple trainings to generate multiple tension inference models: (A3) respectively computing multiple model performances of the multiple tension inference models according to the anomaly score and a pre-recorded data label: (A4) computing an averaged model performance of the model performances: (A5) determine whether multiple averaged model performances have been acquired, wherein the multiple averaged model performances correspond to the multiple hyper-parameter sets: (A6) selecting one of the multiple hyper-parameter sets that corresponds to an optimal averaged model performance as a final hyper-parameter set to be trained and to output an final model, wherein the final model includes a framework and parameters. The step (B) includes a step of: (B1) inferring processed data by the final model to generate the anomaly score and the dynamic tension corresponding to the anomaly score.

In order to achieve the above-mentioned objective, the motor driven roller system includes a belt, multiple driven rollers, a motor, an inverter, and a controller. The belt is wreathed around the multiple driven rollers. The multiple driven rollers are connected to and driven by the motor. The motor is connected to and controlled by the inverter. The controller is connected to the inverter and receives real-time data of the motor through the inverter. The controller performs the inference process of the dynamic belt tension inference method as abovementioned according to the real-time data.

Compared to related technologies, the present disclosure can directly infer the tension of the belt when the motor driven roller system is in operation, and can determine whether the current tension is acceptable to the user according to user's settings.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
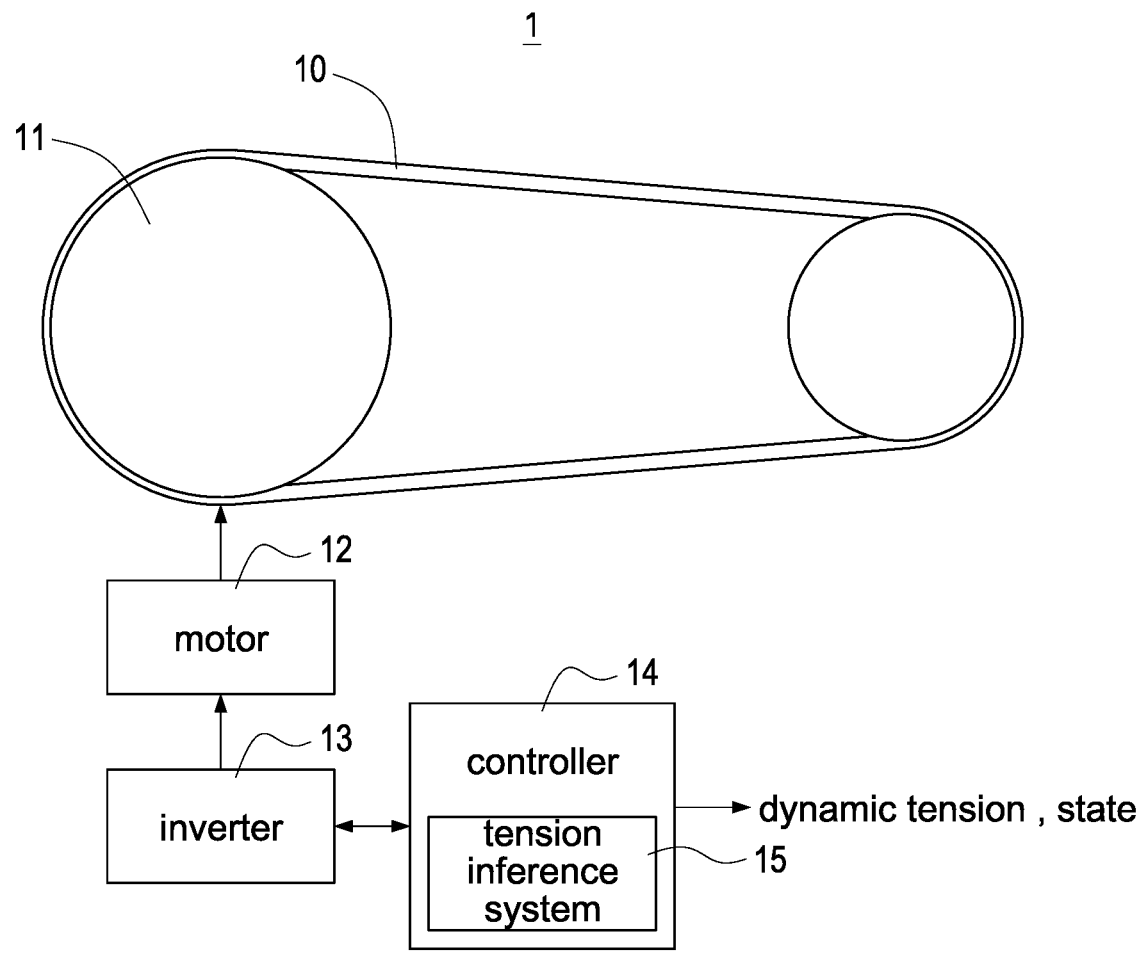
FIG. 1 is a schematic diagram of a motor driven roller system according to an embodiment of the present disclosure.

Reference will now be made to the drawing figures to describe the present disclosure in detail.

The present disclosure provides a dynamic belt tension inference method and a related motor driven roller system. The dynamic belt tension inference method trains an artificial intelligence (AI) model according to stationary and operating (rotation) states of the motor driven roller system. Therefore, the present disclosure can infer the dynamic tension and state of the belt (such as normal or abnormal state) through an AI model when the motor driven roller system is operating.

Please refer to FIG. 1, which shows a schematic diagram of a motor driven roller system according to an embodiment of the present disclosure. The motor driven roller (hereinafter referred to as "MDR") system 1 includes a belt 10, multiple driven rollers 11, a motor 12, an inverter 13, and a controller 14. The belt is wreathed around the multiple driven rollers 11. The multiple driven rollers 11 are connected to and driven by the motor 12. The motor 12 is connected to and controlled by the inverter 13. The controller 14 is connected to the inverter 13 and configured to receive real-time data of the motor through the inverter 13.

In operation, when the multiple driven rollers 11 are driven by the motor 12 to rotate, the belt 10 is dragged by the multiple driven rollers 11 to rotate, and the inverter 13 instantly transmits operating data of the motor to the controller 14. The controller 14 is configured to execute a tension inference system 15 according to the motor's operating data so as to infer the dynamic tension and state when the belt 10 is rotating (i.e., the MDR system 1 is operating).

In general, the tension inference system 15 must be trained before it can perform inference. In one embodiment, the tension inference system 15 is trained by the controller 14. In another embodiment, the tension inference system 15 is trained by an external device, and then the external device outputs the trained tension inference system 15 to the controller 14. The advantage of using the external device for training is that computers or processors with higher performance may be used to accelerate the training process. The tension inference system 15 may be stored in the memory built-in or external to the controller 14.

In one embodiment, the controller 14 may be, for example, but limited to, a central processing unit (CPU), a micro control unit (MCU), a system on chip (SoC), a programmable logic controller (PLC), or the like.

Figure 2:
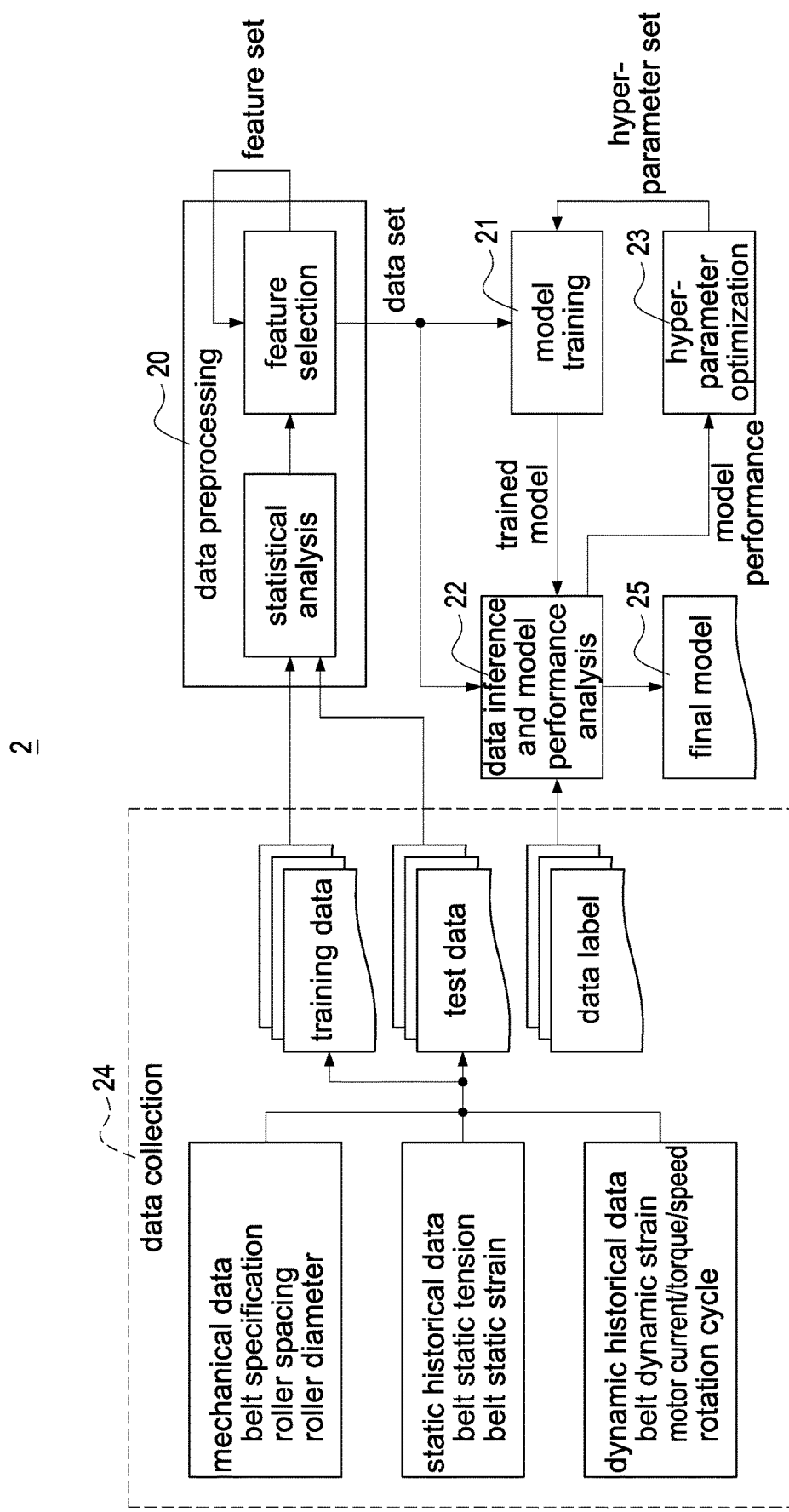
FIG. 2 is a schematic diagram of a model training system according to an embodiment of the present disclosure.

Please refer to FIG. 2, which shows a schematic diagram of a model training system 2 according to an embodiment of the present disclosure. The model training system 2 includes a data collection module 24, a data preprocessing module 20, a model training module 21, a data inference and model performance analysis module (hereinafter abbreviated as "analysis module") 22, and a hyper-parameter optimization module 23.

Regarding the data collection module 24, related data should be collected before training, so that the related data are used to generate the tension inference model and related parameter sets. Specifically, dynamic belt tension relates to mechanical design, belt strain, pressure (or stress), and/or friction force of the MDR system 1, which may be described by three categories of data including mechanical data, static historical data, and dynamic historical data.

In this embodiment, the mechanical data includes at least one of belt specifications (including cross-sectional dimensions of the belt and corresponding normal tension ranges), roller spacings, and roller diameters. In practical applications, technicians manually measure the mechanical data and input the mechanical data into the memory of the controller 14 or the memory of the external device for training. The static historical data includes at least one of a belt static tension (i.e., static tension of the belt) and a belt static strain (i.e., the static strain of the belt). In practical applications, technicians use a tension gauge to measure the static tension of the belt 10 as an initial reference for the belt strain, and use a strain gauge to measure the static strain of the belt 10 at different tensions when the driven rollers 11 are stationary.

The dynamic historical data includes at least one of a belt dynamic strain (i.e., the dynamic strain of the belt), a motor current, a motor torque, a motor speed, and a rotation cycle. When the motor 12 is operating, pressure (stress) and friction force are generated between the belt 10 and the driven rollers 11, such that the dynamic strain differs from the static strain. Therefore, technicians use the strain gauge to measure the dynamic strain of the belt 10 under different tensions when the motor 12 is operating. Moreover, when the motor 12 is operating, the controller 14 collects data such as the motor current, the motor torque, the motor speed, and the in rotation cycle, which are stored into the memory of the controller 14 or the memory of the external device for training. A portion of the collected data may be used as training data, while another portion of the collected data may be used as test data.

In order to verify the performance of the model generated by the training process, technicians need to record data labels in advance. For example, technicians record corresponding states of normal data and abnormal data in the training data and the test data to generate data labels.

The data preprocessing module 20 is configured to perform statistical analysis to the training data and the test data, which includes: calculating a belt strain curve according to a static tension initial reference value, a static strain, and a dynamic strain, as well as calculating statistical values such as mean values, maximums, or minimums, and standard deviations of the training data and the test data. By a feature selection method, multiple influential/dominated features may be selected from the statistical values to generate a feature set for subsequent model training and testing. Specifically, during model training, the data preprocessing module 20 deletes a portion of the training data that does not match with the feature set, and retains another portion of the training data that matches with the feature set as the data set outputted to the model training module 21. During model testing, the data preprocessing module 20 deletes a portion of the test data that does not match with the feature set, and retains another portion of the test data that matches with the feature set as the data set outputted to the analysis module 22.

The model training module 21 is configured to adjust an Isolation Forest algorithm for model training according to the hyper-parameter set recommended by a Bayesian Optimization. The trained model then calculates an anomaly score using the test data that matches with the feature set to determine the (normal or abnormal) state of the belt, and infers a dynamic belt tension according to the belt strain curve.

The analysis module 22 is a module that has been trained by the model training module 21, and is configured to calculate the anomaly score according to inputted test data. The anomaly score corresponds to pre-recorded data labels, and the analysis module 22 uses the data labels to calculate model performances, such as accuracy, precision, and recall.

The hyper-parameter optimization module 23 is configured to acquire a model performance at the previous training from the analysis module 22. Therefore, the Bayesian optimization is performed according to the model performance at the previous training to generate a new hyper-parameter set, which is then provided to the model training module 21 for the next training. By iteration of multiple trainings, the model performances can be gradually optimized. After a fixed number of iterations, the hyper-parameter optimization module 23 selects the hyper-parameter set corresponding to the optimal model performance as a final hyper-parameter set, and provides the final hyper-parameter set to the model training module 21 to train and generate a final model 25. The analysis module 22 outputs the final model 25, i.e., the final tension inference model including a framework and parameters.

Figure 3:
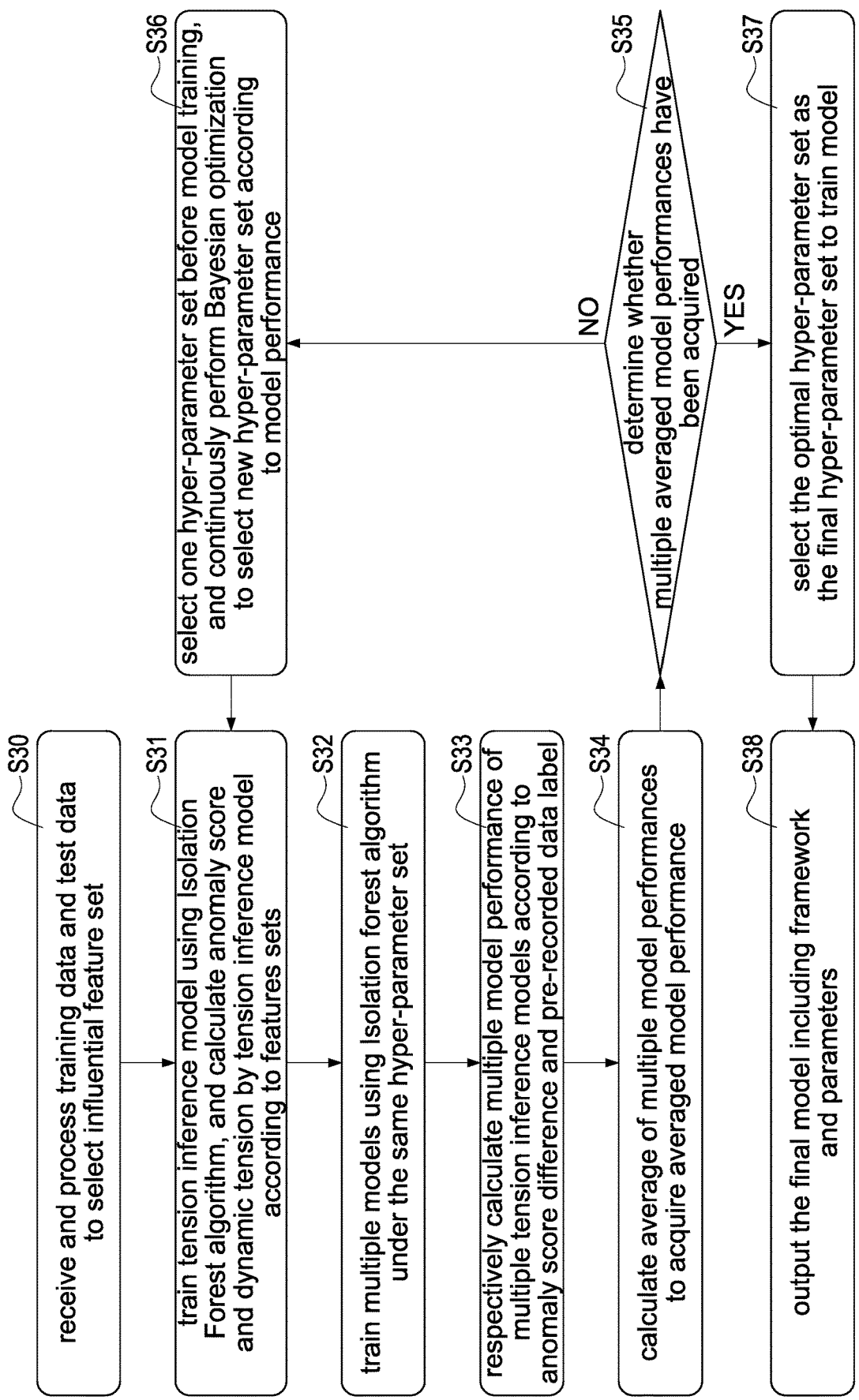
FIG. 3 is a model training flowchart according to an embodiment of the present disclosure.

Please refer to FIG. 3, which shows a model training flowchart according to an embodiment of the present disclosure for detailed operational processes of the model training system 2, which includes the following steps.

Step S30: receive and process the training data and the test data to select an influential feature set.

Step S31: train the tension inference model using an Isolation Forest algorithm. The tension inference model calculates the anomaly score and the corresponding dynamic tension according to the feature sets.

Step S32: use the Isolation Forest algorithm to train multiple models under the same hyper-parameter set.

Step S33: respectively calculate multiple model performances of the multiple tension inference models according to an anomaly score difference and a pre-recorded data label.

Step S34: calculate an average of multiple model performances to acquire an averaged model performance.

Step S35: determine whether multiple averaged model performances have been acquired: go to Step S36 if no, and go to Step S37 if yes. In one embodiment, a number of multiple averaged model performances may be set according to actual conditions, and the multiple averaged model performances respectively correspond to multiple hyper-parameter sets.

Step S36: select one hyper-parameter set before model training. Specifically, the Step S36 is to continuously perform the Bayesian optimization to select a new hyper-parameter set according to the model performance. Specifically, the Bayesian optimization is performed at a fixed number of iterations, an optimal averaged model performance in record is compared with the current averaged model performance, and the optimal model performance and corresponding hyper-parameter set are continuously updated. If it is determined that the iteration has been completed, the Step S31 to the Step S35 are performed again.

Step S37: select the optimal hyper-parameter set in record as the final hyper-parameter set to train the model.

Step S38: output the final model including a framework and parameters.

In the present disclosure, the Step S30 may be executed by the data preprocessing module 20, the Steps S31, S32, and S37 may be executed by the model training module 21, the Steps S33, S34, and S35 may be executed by the analysis module 22, and the Step S36 may be executed by the hyper-parameter optimization module 23.

Figure 4:
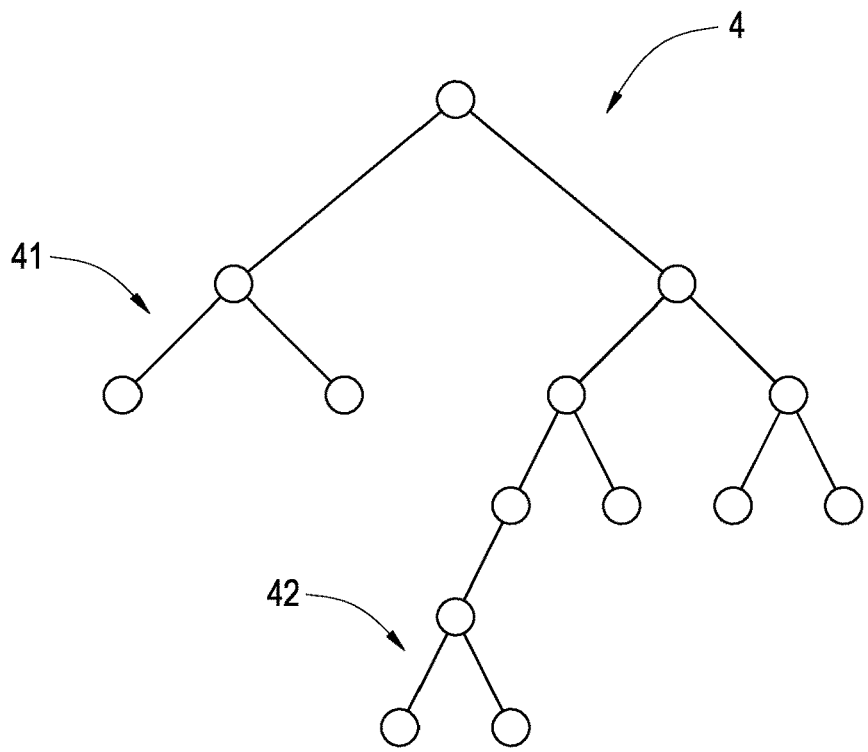
FIG. 4 is a schematic tree-like structure of an isolation forest.

For the Step S31, please refer to FIG. 4, which shows a schematic tree-like structure 4 of an isolation forest. In industrial applications, there is often a large quantity difference between normal data and abnormal data in the collected data. For example, the number of good products (corresponding to the normal data) on a production line is usually greater than the number of defective products (corresponding to the abnormal data). On the other hand, since there are many abnormal situations (such as product damage and failure patterns) that have never occurred in the industrial environment, there is no corresponding labels that can be directly learned. Since the Isolation Forest algorithm can adapt to the problem of data imbalance, and belongs to unsupervised learning that can adapt to multiple abnormal conditions, the present disclosure uses the Isolation Forest algorithm to train the tension inference model. As shown in FIG. 4, when the data are classified through the tree-like structure 4, characteristics of abnormal data are different from that of other normal data, and therefore the abnormal data can be distinguished earlier. Outliers (i.e., the abnormal data) 41 generally have smaller tree depths. On the other hand, inliers (i.e., the normal data), which tend to be closer to the majority or normal distribution, will continue to be classified within the group, resulting in larger tree depths.

The model training module 21 can use the following formulas (1), (2), and (3) according to the Isolation Forest algorithm to calculate the anomaly score and its corresponding dynamic tension:

$$s(x, n) = 2^{-\frac{E(h(x))}{c(n)}} \quad \text{formula (1)}$$

$$c(n) = 2H(n-1) - \left(\frac{2(n-1)}{n}\right) \quad \text{formula (2)}$$

$$H(k) = \ln k + \zeta, \zeta = 0.5772156649 \quad \text{formula (3)}$$

In the formula (1), x refers to the data being evaluated (a single piece of data within the training data), n refers to the data sample size, s(x, n) refers to the anomaly score of x within a subtree composed of n data samples, the value of s(x, n) ranges from 0 to 1, and h(x) refers to the height of x within a certain subtree. If x is an outlier, h(x) will be smaller, i.e., the height of the outlier 41 is lower, so the anomaly score s(x, n) is closer to 1. If x is an inlier, h(x) will be larger, i.e., the height of the inlier 42 is higher, so the anomaly score s(x, n) is closer to 0. If the anomaly score s(x, n) is close to 0.5, which indicates that there is no obvious outlier in the test data. E(h(x)) refers to an averaged height of x in all subtrees of the tree-like structure 4, and c(n) refers to a function used to normalize E(h(x)).

Figure 5:
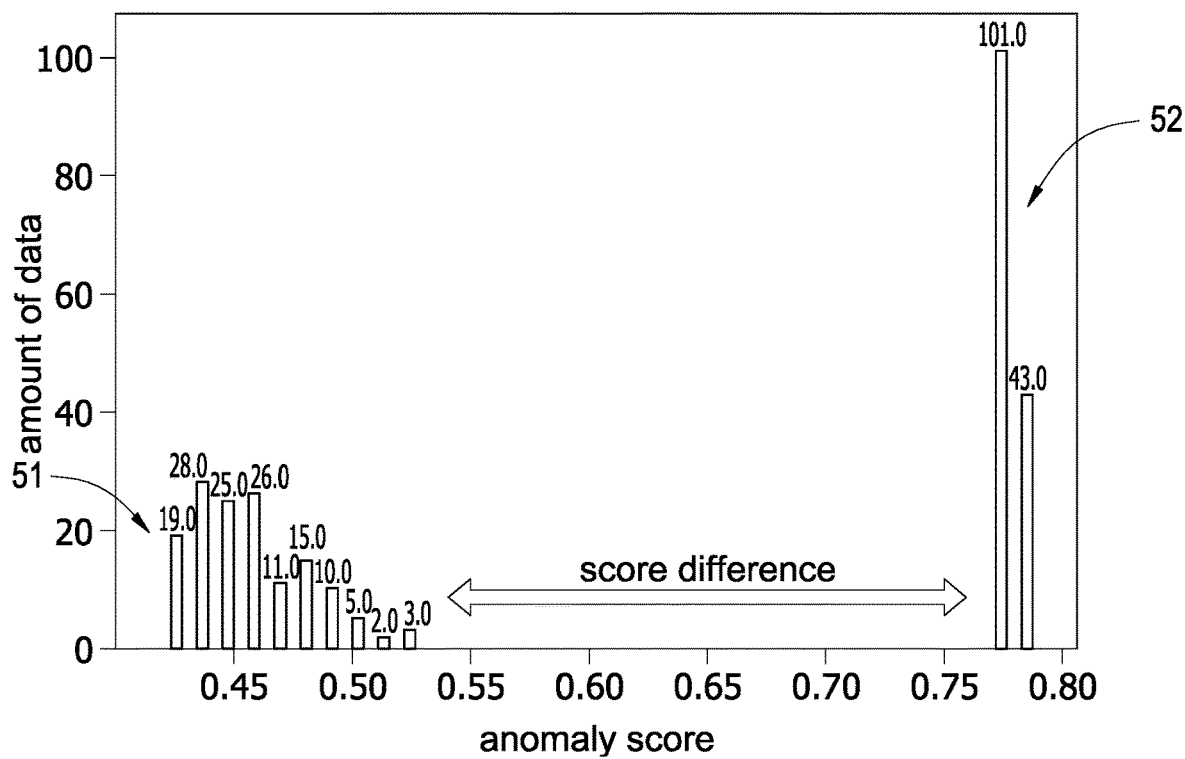
FIG. 5 is a schematic diagram of the difference in the anomaly score according to an embodiment of the present disclosure.

Please refer to FIG. 5, which shows a schematic diagram of the difference in the score difference according to an embodiment of the present disclosure. In the present disclosure, the model performance is inventively defined as the score difference between the anomaly score of the normal data and the anomaly score of the abnormal data. During the model training process, the model training module 21 predicts the anomaly score of the data, maps the anomaly score to the data label, and plots an anomaly score distribution of the normal data and the abnormal data, as shown in FIG. 5. It is worth noting that the larger the score difference between the anomaly score of normal data 51 and the anomaly score of abnormal data 52, the better the model's ability to determine whether a data belongs to a normal state or an abnormal state, and to further infer the dynamic tension.

Figure 6:
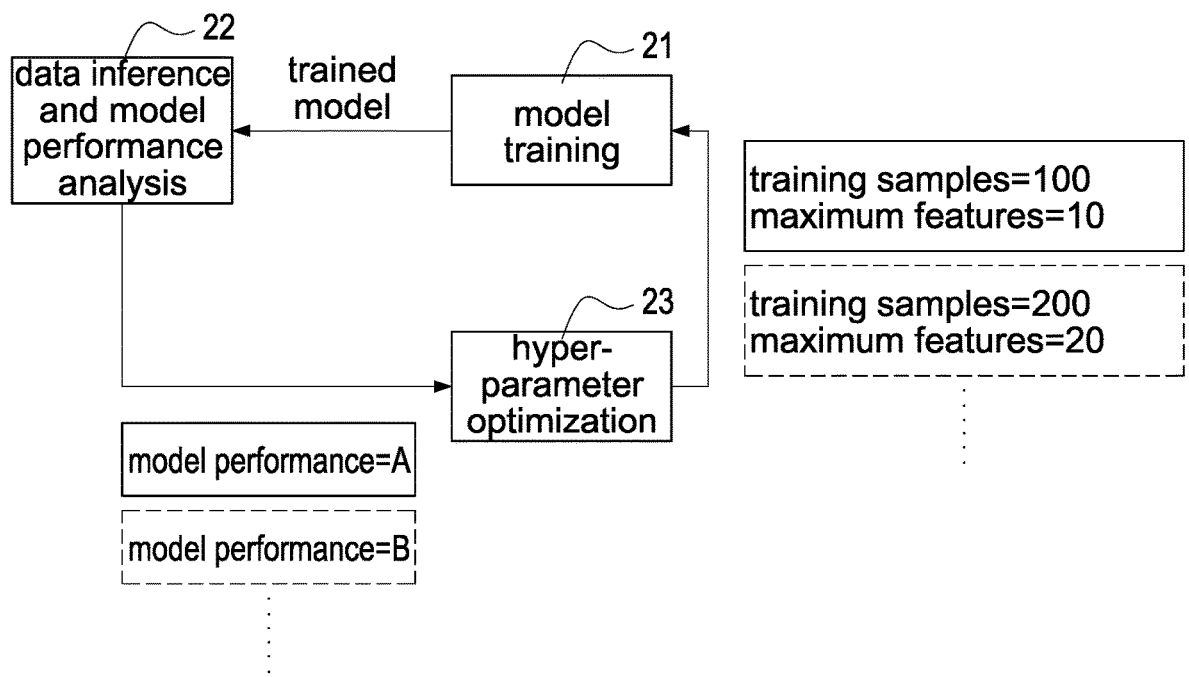
FIG. 6 is a schematic diagram of model optimization cycles according to an embodiment of the present disclosure.

Please refer to FIG. 6, which shows a schematic diagram of model optimization cycles according to an embodiment of the present disclosure. The Isolation Forest algorithm includes multiple hyper-parameters, which are parameters that can be adjusted by users. By adjusting values of the hyper-parameters, the model performance of the trained tension inference model can be improved. In one embodiment, the hyper-parameter set at least includes a number of training samples and a number of maximum features. Specifically, the tree-like structure 4 of the isolation forest is constructed by multiple subtrees. The number of training samples refers to the number of samples extracted for each subtree under the tree-like structure 4, and the number of maximum features refers to the number of features used to train each subtree.

For the Step S36, as shown in FIG. 6, the model training module 21 performs model training to generate the tension inference model (e.g., a model A) according to the hyper-parameter set (e.g., 100 training samples and 10 maximum features). The analysis module 22 (i.e., the model A) then calculates the anomaly score of the input data (e.g., the test data) and calculates the model performance (i.e., the score difference) according to the distribution of the anomaly score. The analysis module 22 records the model performance A as the optimal averaged model performance. While the iteration has not yet completed, the hyper-parameter optimization module 23 performs the Bayesian optimization algorithm according to the model performance A to calculate a new hyper-parameter set (e.g., 200 training samples and 20 maximum features). The model training module 21 then performs model training according to the new hyper-parameter set. The analysis module 22 then calculates the anomaly score of the input data, computes the model performance B (i.e., the score difference) according to the distribution of the anomaly score, compares the optimal averaged model performance with the current averaged model performance (i.e., the model performance B), and continuously updates the optimal model performance value and its corresponding hyper-parameter set. This process continues until the end of the iteration, so as to select the optimal hyper-parameter set for the tension inference model as the final hyper-parameter set.

During iterations of the Bayesian optimization algorithm, by adjusting different hyper-parameter sets x, an unknown objective function f(x) can be solved to find the hyper-parameter set that can achieve the optimal model performance. In this embodiment, the unknown objective function f(x) is defined as the score difference, and the goal of the Bayesian optimization algorithm is to maximize the value of the unknown objective function f(x).

Figure 7:
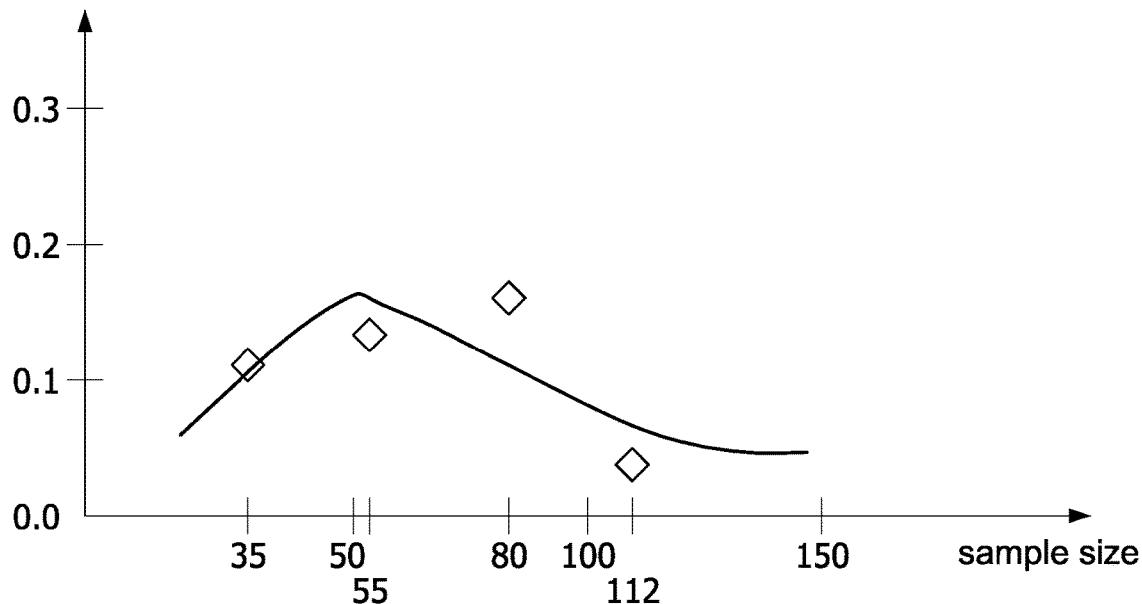
FIG. 7 is a curve of score difference versus hyper-parameter set.

Please refer to FIG. 7, which shows a curve of score difference versus hyper-parameter set (i.e., samples). Applicant noticed a phenomenon of noisy observation. Due to a characteristic of randomness of the Isolation Forest algorithm, even if an exactly same hyper-parameter set is used to train the model multiple times, the generated model performance for each training may vary. Therefore, it is difficult for the Bayesian optimization algorithm to find the best solution for the hyper-parameter set.

In FIG. 7, x-axis represents the number of training samples, and y-axis represents the score difference (i.e., the model performance). It is assumed that the curve in FIG. 7 represents an actual form of the unknown objective function f(x). Due to the randomness of the Isolation Forest algorithm, the best solution (i.e., the largest score difference) found by the Bayesian optimization algorithm was at a sample size of 80, rather than the actual best solution at a sample size of 55. In this situation, the trained model cannot achieve the optimal model performance.

In order to solve the problem of noisy observation phenomenon, the present disclosure selects one hyper-parameter set to train multiple models and takes the average of multiple model performs, so as to select the final hyper-parameter set for training the final model, thereby reducing the impact of noise on the Bayesian optimization algorithm.

Figure 8:
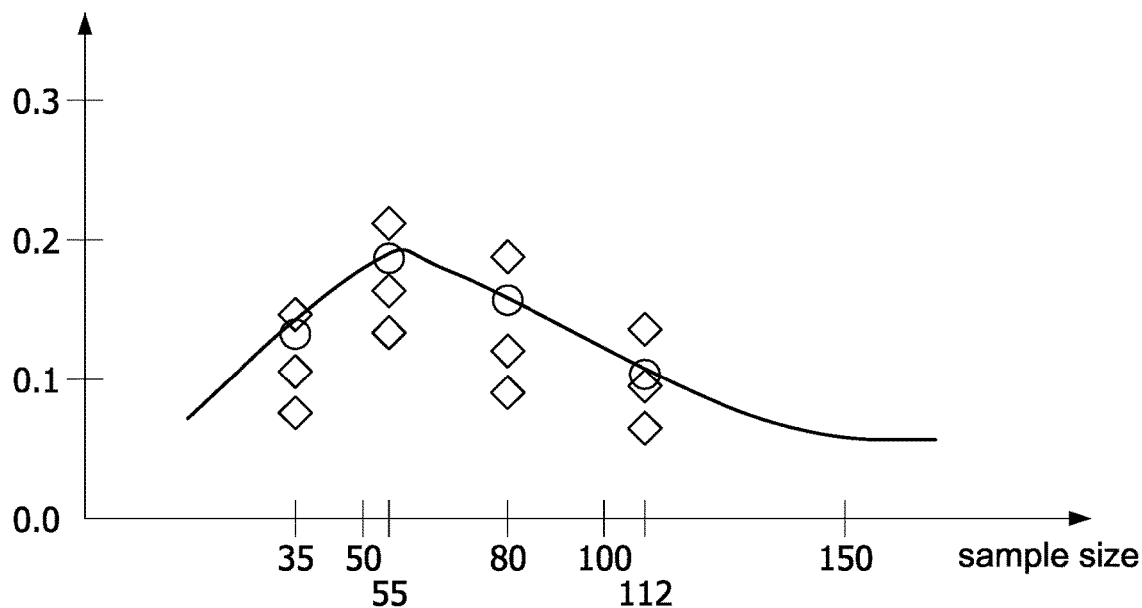
FIG. 8 is a curve of score difference versus hyper-parameter set according to an embodiment of the present disclosure.

Please refer to FIG. 8, which shows a curve of score difference versus hyper-parameter set according to an embodiment of the present disclosure. The present disclosure selects one hyper-parameter set and uses the Isolation Forest algorithm to train the model multiple times to generate multiple tension inference models. Model performances of the multiple tension inference models are calculated to produce an averaged model performance, which is then compared with another averaged model performance of multiple tension inference models under another hyper-parameter set. Finally, the optimal hyper-parameter set that can optimize the model performance is selected to train the final model.

As shown in FIG. 8, in this embodiment, it is assumed that the selected sample size is 35 and the model is trained three times. Therefore, three model performances corresponding to three tension inference models are averaged to produce the score difference or the averaged model performance of 0.14 corresponding to the sample size of 35. And so forth, it is assumed that the selected sample sizes are 55, 80, and 112, the score difference or the averaged model performances of 0.19, 0.16, and 0.11 corresponding to the sample sizes of 55, 80, 112 can be produced respectively. As can be seen, since a candidate model corresponding to the sample size of 55 has the highest averaged model performance, the hyper-parameter set of this candidate model is selected for the Isolation Forest algorithm. In other words, by repeating the Steps S31, S32, S33, S34, S35, and S36 to calculate multiple averaged model performances of multiple candidate hyper-parameter sets, and then selecting the hyper-parameter set with the highest model performance as the setting value for the Isolation Forest algorithm, a better tension inference model can be trained.

Therefore, selecting a specific hyper-parameter set to train multiple models, taking the averaged model performance of those models, and then selecting the final hyper-parameter set with the highest averaged model performance to train the final model can effectively reduce the impact of noise observation phenomenon on the Bayesian optimization algorithm. Thus, the present disclosure can ensure that the final model trained has a better performance and a higher stability at the same time.

Figure 9:
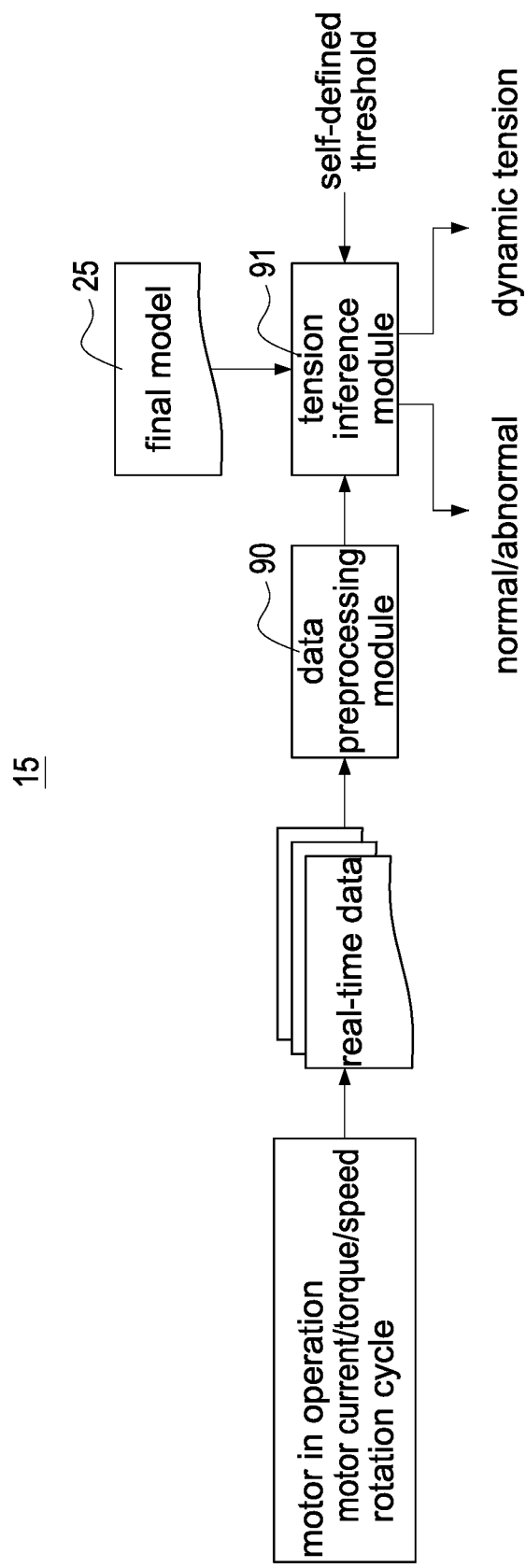
FIG. 9 is a schematic diagram of a tension inference system according to an embodiment of the present disclosure.

Please refer to FIG. 9, which shows a schematic diagram of a tension inference system according to an embodiment of the present disclosure. The tension inference system 15 includes a data preprocessing module 90 and a tension inference module 91. Before the inference is performed, the final model 25, which includes a framework and parameters of the model, needs to be imported into the tension inference model 91.

When the MDR system 1 is working, the inverter 13 provides real-time data such as motor current, torque, speed, and rotation cycle. The data preprocessing module 90 is configured to preprocess the real-time data to generate and output processed data to the tension inference model 91. The tension inference model 91 is configured to infer the processed data to generate an anomaly score to determine whether the belt tension is normal or abnormal, infer the dynamic tension of the belt, and determine whether the current belt tension is within an acceptable range according to a self-defined threshold.

Figure 10:
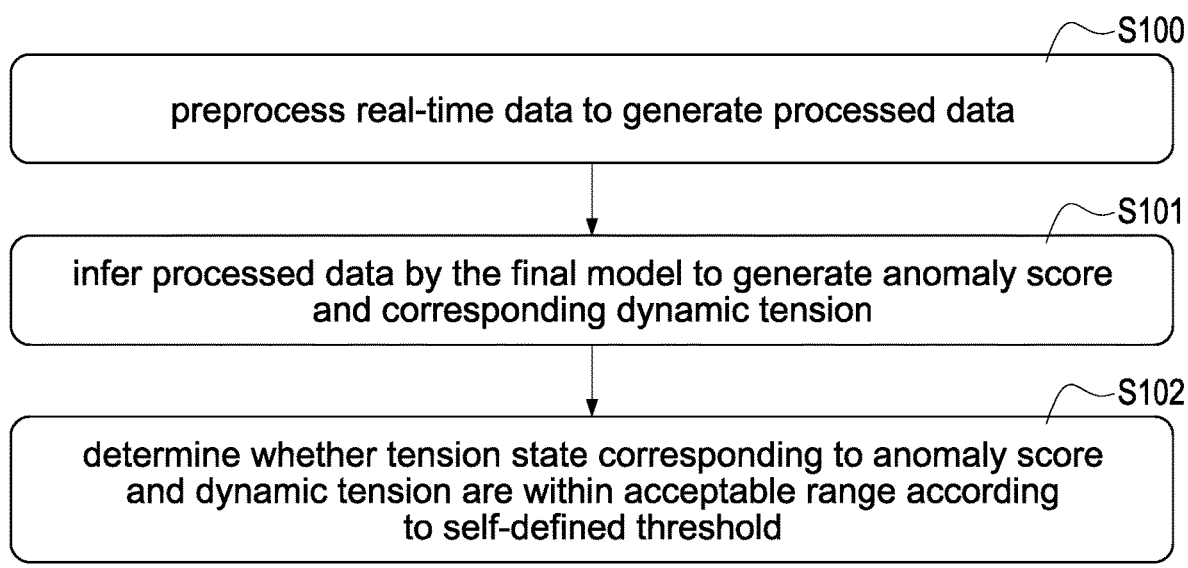
FIG. 10 is an inference flowchart according to an embodiment of the present disclosure.

Please refer to FIG. 10, which shows an inference flowchart according to an embodiment of the present disclosure for detailed operational processes of the tension inference system 15, which includes the following steps.

Step S100: preprocess the real-time data to generate processed data.

Step S101: infer the processed data by the final model to generate the anomaly score and corresponding dynamic tension.

Step S102: determining whether a tension state (normal or abnormal) corresponding to the anomaly score and the dynamic tension are within an acceptable range according to a self-defined threshold.

The Step S100 may be performed by the data preprocessing module 90, and the Steps S101 and S102 may be performed by the tension inference model 91.

For Step S102, different specifications of belts have different normal tension ranges. The present disclosure allows users to set the self-defined threshold, which can be more flexible in selecting the acceptable range of tension for different devices and industries.

In summary, the inference system and the inference method of the present disclosure can perform real-time inference of dynamic tension and state of the belt when the motor driven roller system is operating, thereby confirming whether the force applied to the belt when driven by the motor is fully conveyed (i.e., whether the motor-driving effect is normal).

Although the present disclosure has been described with reference to the preferred embodiment thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A dynamic belt tension inference method, comprising steps of:
    (A) performing a training process, comprising steps of:
    (A1) by a controller, using an Isolation Forest algorithm to train a tension inference model, wherein the tension inference model is configured to generate an anomaly score and a dynamic tension corresponding to the anomaly score;
    (A2) by the controller, using the Isolation Forest algorithm under same hyper-parameter set to perform multiple trainings to generate multiple tension inference models;
    (A3) by the controller, respectively computing multiple model performances of the multiple tension inference models according to the anomaly score and a pre-recorded data label;
    (A4) by the controller, computing an averaged model performance of the multiple model performances;
    (A5) by the controller, determining whether multiple averaged model performances have been acquired, wherein the multiple averaged model performances correspond to the multiple hyper-parameter sets;
    (A6) by the controller, selecting one of the multiple hyper-parameter sets that corresponds to an optimal averaged model performance as a final hyper-parameter set for training to output a final model, wherein the final model includes a framework and parameters; and
    (B) performing an inference process, comprising steps of:
    (B1) by the controller, using the final model to infer processed data to generate the anomaly score and the dynamic tension corresponding to the anomaly score, wherein the processed data is generated by preprocessing data of a motor that drives a belt to rotate, and the final model is used to infer the dynamic tension of the belt while the belt is rotating.

2. The dynamic belt tension inference method of claim 1, wherein the model performance is defined as: a score difference between the anomaly score of normal data and the anomaly score of abnormal data.

3. The dynamic belt tension inference method of claim 2, wherein the step (A) further comprises steps of:
    (A11) performing a Bayesian optimization under a fixed number of iterations if the multiple averaged model performances have not been acquired, comparing a recorded optimal averaged model performance with a current averaged model performance, and continuing to select a new hyper-parameter set when the fixed number of iterations has not finished; and
    (A12) repeatedly performing the steps (A1), (A2), (A3), (A4), and (A5) based on the new hyper-parameter set.

4. The dynamic belt tension inference method of claim 3, wherein during a first execution of the step (A1) to train the tension inference model, the Bayesian optimization algorithm first selects an arbitrary hyper-parameter set for the Isolation Forest algorithm, wherein the Bayesian optimization algorithm is used to maximize a value of an unknown objective function that is defined as the score difference.

5. The dynamic belt tension inference method of claim 1, wherein before the step (A1), the step (A) further comprises a step of:
    (A0) receiving and processing training data and test data to select an influential feature set, comprising steps of:
    calculating a belt strain curve according to a static tension for initial reference, a static strain, and a dynamic strain; and
    calculating statistical values of the training data and the test data and using a feature selection method to select multiple influential features from the statistical values to generate the feature set,
    wherein the tension inference model calculates the anomaly score according to the test data that matches with the feature set, and infers the dynamic tension corresponding to the anomaly score according to the belt strain curve.

6. The dynamic belt tension inference method of claim 5, wherein in the step (A), the test data and the training data comprise:
    mechanical data comprising at least one of cross-sectional dimensions of the belt, and normal tension range values, roller spacings, and roller diameters corresponding to the cross-sectional dimensions of the belt;
    static historical data comprising at least one of the static tension and the static strain; and
    dynamic historical data comprising at least one of a belt dynamic strain, a motor current, a motor torque, a motor speed, and a rotation cycle.

7. The dynamic belt tension inference method of claim 1, wherein before the step (B1), the step (B) further comprises a step of:
    (B0) preprocessing real-time data to generate the processed data,
    wherein the real-time data comprises at least one of a motor current, a motor torque, a motor speed, and a rotation cycle.

8. The dynamic belt tension inference method of claim 1, wherein the step (B) further comprises a step of:
    (B2) determining whether the dynamic tension corresponding to the anomaly score is within an acceptable range according to a self-defined threshold, wherein the self-defined threshold indicates a normal tension range of the belt.

9. The dynamic belt tension inference method of claim 1, wherein the hyper-parameter set comprises at least one of multiple training samples and multiple maximum features.

10. A motor driven roller system, comprising a belt, multiple driven rollers, a motor, an inverter, and a controller, wherein:
    the belt is wreathed around the multiple driven rollers,
    the multiple driven rollers are connected to and driven by the motor, the motor is connected to and controlled by the inverter, the controller is connected to the inverter and configured to receive real-time data of the motor through the inverter, and the controller is configured to perform the inference process of the dynamic belt tension inference method in claim 1 according to the real-time data.

\* \* \* \* \*